3,463,644
Patented Aug. 26, 1969

3,463,644
CARBOXYMERCAPTAL HYDROCARBON TIN SALTS WITH ANTIFOULING MARINE PAINT OR COATING BIOCIDAL ACTIVITY
Ingenuin Hechenbleikner and Paul F. Thompson, Cincinnati, Ohio, assignors to Carlisle Chemical Works, Inc., Reading, Ohio, a corporation of Ohio
No Drawing. Filed May 10, 1966, Ser. No. 548,878
Int. Cl. A61k 27/00
U.S. Cl. 106—15                     4 Claims

ABSTRACT OF THE DISCLOSURE

Bacteria, fungi, nematodes and barnacles are killed by applying a hydrocarbon tin salt of a carboxymercaptal.

The present invention relates to biocidal materials.
It is an object of the present invention to prepare novel biocides.
Another object is to kill fungi.
An additional object is to kill bacteria.
A further object is to kill mites.
Yet another object is to kill nematodes.
A still further object is to kill insects.
Yet another object is to afford protection against barnacles.
Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying to the habitat of the pest a hydrocarbon tetravalent tin salt of a carboxymercaptal, the carboxymercaptal group being attached to the tin through oxygen, there being three hydrocarbon groups attached to each tin atom. Preferably, the sum of the carbon atoms in the hydrocarbon groups attached to each tin atom is from 9 to 18 or 20 carbon atoms although each of the groups can contain as little as 1 or as many as 20 carbon atoms. The hydrocarbon groups attached to each tin atom can be the same or different.

For the most part, the biocides of the present invention are disclosed as novel compounds in Hechenbleikner, Bresser and Homberg Patent No. 3,217,004 issued Nov. 9, 1965, on application 351,879, filed Dec. 30, 1963, which application is a division of application Ser. No. 191,463, filed May 1, 1962, now U.S. Patent 3,196,129, issued July 20, 1965, and a continuation-in-part of application Ser. No. 103,256, filed Apr. 17, 1961, now U.S. Patent 3,078,-290, issued Feb. 19, 1963. Those compounds which are not shown in that patent, however, can be prepared by the procedures set forth in the Hechenbleikner et al. patent. For example, 1 mole of cyclohexanone and 2 moles of mercaptopropionic acid can be reacted to produce cyclohexane-1,1-bis (mercaptopropionic acid), see Example 7 of the Hechenbleikner et al. patent and this compound reacted with an equimolar amount of tributyltin oxide to produce cyclohexane-1,1-bis (tributyltin β-mercaptopropionate) (also called bis (tributyltin) cyclohexane-1,1-bis-β-mercaptopropionate).

Similarly, 1 mole of levulinic acid can be reacted with 2 moles of mercaptopropionic acid to form 4,4-bis (carboethylthio) pentanoic acid using either procedure A, B, C or D of the Hechenbleikner et al. patent, column 8, and 1 mole of this compound reacted with 1.5 moles of tributyltin oxide to produce tributyltin-4,4-bis (tributyltincarboethylthio) pentanoate.

It is critical that there be three hydrocarbon groups attached to each tin atom since similar compounds having 1 or 2 hydrocarbon groups attached to the tin atoms, e.g. the compounds of Formulae I through V and A through D of the Hechenbleikner et al. patent do not have significant biocidal activity. On the other hand, the compounds set forth in the Hechenbleikner et al. patent having Formulae E through K are suitable for use according to the invention.

The compounds of the present invention are particularly effective against microorganisms such as fungi and bacteria but are also effective against mites, nematodes, barnacles and insects. They are applied to the habitat of the pest either in 100% concentration or in combination with conventional pesticidal adjuvants or carriers as dusts or suspended or dissolved in liquids. Typical solid adjuvants are talc, pyrophyllite, synthetic fine silica, attapulgus clay, kieselguhr, chalk, diatomaceous earth, calcium carbonite, bentonite, fuller's earth, cottonseed hulls, wheat flour, walnut shell flour, soyabean flour, pumice, tripoli, wood flour, redwood flour and lignin.

The compounds of the present invention can also be used suspended in a liquid diluent such as water. There can also be added surface active agents and inert solids in such liquid formulations. Thus, 0.05–1% by weight of a surface active agent can be employed. The active ingredient can be from 0.01 to 95% by weight of the entire composition in such cases.

In place of water there can be employed organic solvents as carriers, e.g. hydrocarbons such as benzene, toluene, xylene, kerosene, diesel oil, fuel oil and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, butyl acetate and amyl acetate, ethers such as ethylene glycol monomethyl ether and diethylene glycol monomethyl ether, alcohols, e.g. ethanol, isopropanol and amyl alcohol.

The novel pesticides acn also be applied as aerosols, e.g. by dispersing them in air by means of a compressed gas such as dichlorodifluoromethane or trichlorofluoromethane and other Freons for example.

If surface active agents, e.g. wetting agents, are added they can be anionic, cationic or nonionic in character and can be employed in both solid and liquid compositions.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenolethylene oxide condensation products, e.g., p-isooctyl phenol condensed with 10 ethylene oxide units, soaps, e.g. sodium stearate and potassium oleate, sodium salt of propylnaphthalene sulfonic acid, di (2-ethylhexyl) ester of sodium sulfosuccinic acid, sodium lauryl sulfate, sodium tetradecanesulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g. Ethofat 7 and Ethofat 13, sodium N-methyl-N-oleyl taurate, Turkey Red Oil, sodium dibutylnaphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

A preferred group of compounds useful in the present invention have the formula (A) 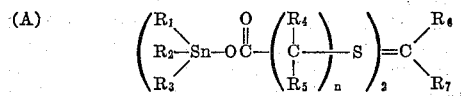

where $R_1$, $R_2$ and $R_3$ are alkyl, aralkyl or aryl, $R_4$ and $R_5$ are hydrogen, alkyl or aryl, $R_6$ and $R_7$ are hydrogen, alkyl, aryl,

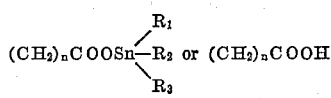

or

together are cyclopentylidene

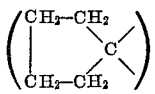

or cyclohexylidene and $n$ is an integer between 1 and 4.

There can also be employed compounds of the formula (B) 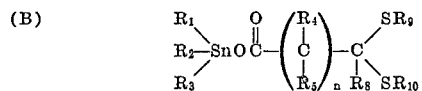

where $R_8$ is hydrogen, alkyl or aryl and $R_9$ and $R_{10}$ are alkyl, aryl, carboxylic acid or carboxylic acid ester and (C) 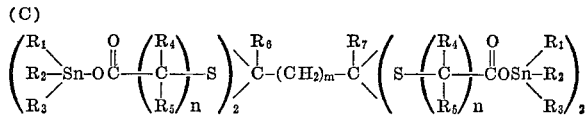

where $m$ is an integer from 0 to 8, inclusive.

Of course as indicated previously, there can be used the compounds of Formulae E through K of Hechenbleikner et al. Patent No. 3,217,004, col. 3. Specifically, there can be used compounds having the following formulae (D) 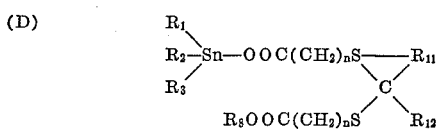

where $R_8$ is H or

and $R_{11}$ and $R_{12}$ are H, alkyl or aryl and

together are cyclopentylidene or cyclohexylidene;

(E) 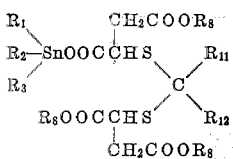

(F) 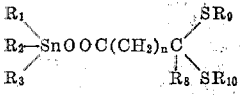

(G) 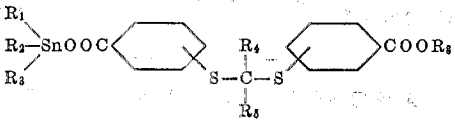

(H) 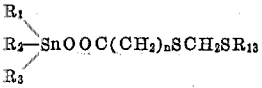

where $R_{13}$ is alkyl or aryl; and (I) 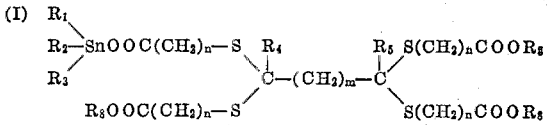

Example of compounds useful as biocides according to the present invention are cyclohexane-1,1-bis (tributyltin thioglycolate);
cyclohexane-1,1-bis(tributyltin β-mercaptopropionate);
tributyltin-4,4-bis (tributyltin-carbomethylthio) pentanoate;
tributyltin-4,4-bis (tributyltincarboethylthio) pentanoate;
propane-2,2-bis (tributyltin thioglycolate);
propane-2,2-bis (tributyltin β-mercaptopropionate);
benzal bis (tributyltin thioglycolate);
methane-bis (triphenyltin thioglycolate);
tetra (tripropyltin) ethane 1,1,2,2-tetrakis (γ mercaptobutyrate);
benzal bis (ethyl, butyl, phenyltin mercaptoisopropionate);
benzal bis (ethyl, butyl, phenyltin thioglycolate);
propane-2,2-bis (tributyltin thioglycolate);
benzal bis (tributyltin β-mercaptopropionate);
propane bis (butyl, octyl, octadecyltin mercaptoacetate);
propane-2,2-bis (trioctyltin mercaptooctanoate);
hydroxybenzal bis (triphenyltin β-mercaptopropionate);
cyclohexane-1,1-bis (trimethyltin mercaptoacetate);
2-hydroxy-4-methoxybenzal-bis (tribenzyltin mercaptobutyrate);
tributyltin propane-2,2-bis-β-mercaptopropionate;
trioctyltin benzal di-mercaptoacetate;
tributyltin propane 2,2-bis-mercaptosuccinate;
bis (tributyltin) propane-2,2-bis-(mercaptosuccinate);
tris (triphenyltin) propane 2,2-bis-(mercaptosuccinate);
tetra (trioctyltin) propane 2,2-bis-(mercaptosuccinate);
tetra (tripropyltin) propane 2,2-bis-(mercaptoglutarate);
tetra (tributyltin) cyclohexane 1,1-bis (mercaptosuccinate);
tributyltin 4,4-bis (dodecylthiovalerate);
tributyltin 4,4-bis (phenylthio) valerate;
trioctadecyltin 4,4-bis (phenylthio) valerate;
trioctyltin 4,4-bis (carboxyethylthio) valerate;
butyl propyl ethyltin 4,4-bis (carbobutoxyethylthio) valerate;
trimethyltin 4,4-bis (dodecylthio) valerate;
trioctyltin ethyl-3,3-bis (carboxyethylthio) butyrate;
triphenyltin 3,3-bis (benzylthio)-3-phenyl propionate;
bis (tributyltin) propane-2,2-bis (2′-mercaptobenzoate);

bis (tributyltin)-2-hydroxybenzaldi-(2'-
   mercaptobenzoate);
bis (triphenyltin) benzaldi (2'-mercaptobenzoate);
bis (trioctyltin) methane-bis (4-mercaptobenzoate);
bis (trilauryltin) diphenyl methane-bis-(3-
   mercaptobenzoate);
bis (trimethyltin) ethane-1,1-bis (2'-mercaptobenzoate);
tributyltin propane-2,2-bis (2'-mercaptobenzoate);
tributyltin dodecylthiomethyl thioacetate;
trilauryltin methylthiomethyl thiopropionate;
trimethyltin phenylthiomethyl thiooctanoate;
triphenyltin benzylthiomethyl thioacetate;
trioctyltin-1-methylethane-1,1,2,2-tetrakis
   (mercaptoacetate);
tributyltin ethane 1,1,2,2-tetrakis (mercaptopropionate);
bis (tributyltin) ethane 1,1,2,2-tetrakis
   (mercaptopropionate);
tris (tributyltin) ethane 1,1,2,2-tetrakis
   (mercaptopropionate);
tetra (tributyltin) ethane 1,1,2,2-tetrakis
   (mercaptopropionate);
tetra (triphenyltin) butane 1,1,4,4-tetrakis
   (mercaptopropionate);
tetra (trilauryltin) hexane-1,1,6,6-tetrakis
   (mercaptooctanoate).

The compounds of the present invention in many instances are superior to tributyltin oxide (TBTO) as biocides. In addition, they have better hydrolytic stability than TBTO, are solids and are more difficult to leach out. Also, they are safer for use in controlling barnacles without injury to fish.

Example 1

A chlorowax modified alkyd resin enamel was employed to compare tributyltin oxide (TBTO) and bis (tributyltin) propane bis (mercaptopropionate) [also called propane-2,2-bis (tributyltin-β-mercaptopropionate)] as additives for antifouling paints. The TBTO and bis (tributyltin) propane bis (mercaptopropionate) (ATM) were incorporated at levels of 5% and 10% based on total coating solids. After a three month exposure period, the panel with 5% TBTO showed heavy slime and 10% of the exposed surface area had barnacle attachment. After seven months, this same panel still had heavy slime and 15% barnacle attachment. In contrast, the ATM at the 5% level had completely eliminated fouling for the full seven months exposure period with only a medium amount of slime. The control panel without antifouling additive failed completely with 100% fouling attachment within a period of two months. The 10% TBTO and ATM both accumulated medium slime after the seven month test cycle.

Example 2

In order to test extractability or leachability, the Guppy Mortality Test was employed. In this test, a tongue depressor, coated with the paint formulation, was immersed in an aquarium with guppies. The relative mortality of the samples containing TBTO and ATM reflects the rate of extractability since both TBTO and ATM alone give 100% mortality in 1 p.p.m. in one hour.

An antifouling paint containing cuprous oxide as the toxicant showed no guppy mortality after 72 hours of exposure.

A similar antifouling paint but also including 7% TBTO had the following mortality rates:

| Hours: | Percent |
|---|---|
| 33 | 0 |
| 48 | 20 |
| 52 | 40 |
| 55 | 60 |
| 72 | 100 |

In contrast, the guppy mortality rate for ATM was as follows:

| Hours: | Percent |
|---|---|
| 33 | 0 |
| 48 | 12.5 |
| 50 | 25 |
| 57 | 25 |
| 72 | 37.5 |
| 76 | 37.5 |

Example 3

An antifoulant paint formulation was prepared from 60 parts cuprous oxide, 6 parts vinyl chloride-vinyl acetate copolymer (Vinylite VYHH), 6 parts rosin, 5 parts ATM, 14 parts methyl ethyl ketone and 14 parts toluene. The resulting paint effectively resisted barnacles.

Example 4

The following compounds were tested against microorganisms:

TABLE 1

| Compound: | Name |
|---|---|
| 1 | Cyclohexane-1,1-bis (tributyltin thioglycolate). |
| 2 | Cyclohexane-1,1-bis (tributyltin mercaptopropionate). |
| 3 | Tributyltin-4-bis (tributyltin carbomethylthio) pentanoate. |
| 4 | Tributyltin-4,4-bis (tributyltin carboethylthio) pentanoate. |
| 5 | Propane-2,2-bis (tributyltin thioglycolate). |
| 6 | Propane-2,2-bis (tributyltin mercaptopropionate). |
| 7 | Benzal bis (tributyltin thioglycolate). |

The activities of these compounds in controlling bacterial growth was determined by the following test procedure.

The culture medium was prepared by boiling 5 grams of beef extract (Difco), 10 grams peptone (Peptamin Difco) and 5 grams of sodium chloride in 1000 ml. of distilled water. After cooling, the solution was adjusted to a pH of 6.8–6.9. The medium was tubed in 9.9 ml. quantities in 20 x 150 mm. bacteriological tubes, capped with aluminum caps and sterilized at 15 p.s.i. steam pressure (121° C.) for 20 minutes. These tubes were used for daily transfers of the test organisms and as contact tubes.

The test organism, Staphylococcus aureus ATCC No. 6538 was maintained in stock culture on nutrient agar and stored at refrigerator temperature. From the stock culture, broth cultures were started weekly and maintained by daily transfers for use in tests.

Dilutions of the above compounds were prepared at 100 times the desired test concentration in isopropyl alcohol. 0.1 ml. of the solvent solutions were added to 9.9 ml. respectively or nutrient broth to achieve the desired test concentration. Three tubes were prepared for each concentration and an additional tube was prepared and left uninoculated to serve as a control for sample sterility and turbidity. Each set of three medicated tubes were inoculated with 0.1 ml. of a 24 hour broth culture of the test inoculum.

TABLE 2

| Compound: | Concentration in p.p.m. causing complete inhibition of growth of S. aureus |
|---|---|
| 1 | <1 |
| 2 | <1 |
| 3 | <1 |
| 4 | <1 |
| 5 | <1 |
| 6 | <1 |
| 7 | <1 |

Example 5

The activity of the compounds of Table 1 in controlling fungal growth was determined by the following test procedure:

The desired concentration of each compound was added to 200 ml. of melted Sabouraud dextrose agar, mixed thoroughly, poured into a Petri plate and allowed to harden. These plates were inoculated by streaking one of the test inocula across the surface of the plates containing the test compounds. A single streak was made with a platinum loop. The inocula were 48-hour Sabouraud broth cultures of *Canida albicans* ATCC 102231 and spores of *Aspergillis niger* ATC 8642 and *Trichophyton interdigitale* ATC 9533.

Inocular controls were prepared by making similar streaks onto untreated Sabouraud dextrose agar plates.

The plates were incubated at room temperature and usually inspected after 5 and 17 days.

als such as leather and carbohydrates, e.g. cellulosic materials such as paper and wood to protect them from microorganisms. The compounds are also useful against microorganisms commonly found in water and water-processing and in petroleum and products obtained from petroleum. The amount of active compound employed in the described applications is normally in the range of 1 part per million to 2 parts per hundred although smaller or larger concentrations can be employed.

The compounds of the present invention as indicated are useful as nematocides. Thus Compound 1 of the above Table 1 was employed at 200 p.p.m. to kill Panagrellus and Rhabditis spp. in water.

Two spotted mites were killed by spraying an aqueous suspension of Compound 1 of Table 1 on the mites. The compound was also effective to kill roaches and milk weed bugs.

TABLE 3.—ACTIVITY OF COMPOUNDS AT 5 P.P.M. AGAINST FUNGI

| Compound | 5 days incubation | | | 17 days incubation | | |
|---|---|---|---|---|---|---|
| | A. niger | C. albicans | T. interdigitale | A. niger | C. albicans | T. interdigitale |
| 1 | 0 | 0 | 0 | 0 | 0 | 0 |
| 2 | 0 | 0 | ½ | 0 | ½ | 1 |
| 3 | 1 | ½ | 1 | 1 | 1 | 2 |
| 4 | 0 | 0 | 0 | 0 | 0 | 0 |
| 5 | 0 | 0 | 0 | 0 | 0 | 0 |
| 6 | 0 | 0 | ½ | 0 | ½ | 1 |
| 7 | 0 | 0 | 0 | 0 | 0 | 0 |
| Control | 3 | 3 | 3 | 3 | 3 | 3 |

In the above test, the legend is as follows: 0=no growth of organism; ½=very slight growth; 1=slight growth; 2=moderate growth; 3=heavy growth.

Example 6

In a typical application of the compounds of Table 1, blue-line cotton fabric was treated with sufficient quantities of acetone solutions of the compounds to deposit the concentration listed below. After drying, the fabrics were subjected to soil burial testing of 14 days duration in contact with mixed fungal organisms that included *Aspergillus niger*, *Aspergillis flavus* and *Penicillium luteum*. Tensile strength determination of the exposed fabrics were compared to tensile strength values of the unexposed fabrics to obtain percent tensile strength losses.

TABLE 4.—TENSILE STRENGTH LOSSES AFTER 14 DAY SOIL BURIAL TESTING

Percent tensile strength loss

| Compound | 0.4% compound in fabric | 0.5% compound in fabric |
|---|---|---|
| 1 | 0 | 4 |
| 2 | 0 | 1 |
| 3 | 9 | 0 |
| 4 | 17 | 0 |
| 5 | 17 | 0 |
| 6 | 19 | 5 |
| 7 | 29 | 0 |
| Untreated | 100 | 100 |

The compounds of the invention can also be employed for other substrates to inhibit the growth of microorganisms. Some of the physical properties of the compounds of the present invention such as low volatility, high molecular weight, lack of odor, poor leachability or extractability by water and good thermal and light stability, are advantageous for fabric impregnation, e.g. cotton, rayon, cellulose esters, e.g. cellulose acetate, and for water-based paint formulations (e.g. latex paints), oil-based paints and other coating formulations such as varnishes, lacquers, shellacs, enamels, marine anti-fouling paints and coatings. They are also useful to impregnate proteinaceous materi- Example 7

The following formulation was tested as an anti-fouling paint:

| | Parts |
|---|---|
| Iron oxide | 140.8 |
| Aluminum silicate | 88 |
| Zinc oxide | 200 |
| Calcium carbonate | 161 |
| 65% solution of rosin in naphtha | 400 |
| Coal tar | 80 |
| Pine oil | 80 |
| High flash naphtha | 120 |
| ATM | 20 |

This composition was then tested as an anti-fouling coating and it was found that even though no cuprous oxide was employed it was a good anti-fouling paint and there was only a very minor amount of barnacle growth which was not enough to cause any concern. Anti-fouling paints were also successfully prepared from the above formulation replacing the ATM by (a) 50.5 parts of ATM, (b) 70.7 parts of ATM and (c) 101 parts of ATM.

The use of ATM was also successful in similar paint formulations including cuprous oxide. Thus, there were successfully used the following formulations:

| | Parts |
|---|---|
| Iron oxide | 100 |
| Aluminum silicate | 62 |
| Zinc oxide | 200 |
| Cuprous oxide | 200 |
| Calcium carbonate | 117 |
| 65% rosin solution | 400 |
| Coal tar | 80 |
| Pine oil | 80 |
| High flash naphtha | 120 |
| ATM as indicated. | |

Anti-fouling protection was obtained when utilizing ATM in the following parts in this formulation: (a) 22 parts, (b) 55 parts and (c) 77 parts.

There were also produced paints having successful anti-fouling protection when the cuprous oxide in this formulation was reduced to 100 parts, the aluminum silicate increased to 75 parts, the calcium carbonate increased to 139 parts, the iron oxide increased to 120.4 parts and utilizing ATM in the following amounts: (a) 21 parts, (b) 53 parts, (c) 74 parts and (d) 105 parts.

As used in the claims, the term "mercaptal" is generic to mercaptals and mercaptols.

We claim:

1. In a process of affording protection against marine fouling barnacle or like marine fouling pests comprising exposing, as an antifouling marine paint or coating additive, to protect a marine foulable base or surface against biological attack and fouling, incorporated at effective levels, based on total coating solids, into the marine habitat of a barnacle, a pesticidally effective amount of an organo-tin compound, the improvement which consists of the steps of employing a hydrocarbon tetravalent tin salt of a carboxymercaptal, the carboxymercaptal group being attached to the tin through oxygen and there being three hydrocarbon groups attached to each tin atom, effective in controlling barnacles or like marine fouling pests, without injury to fish.

2. A process according to claim 1 wherein the tin salt has a formula selected from the group consisting of

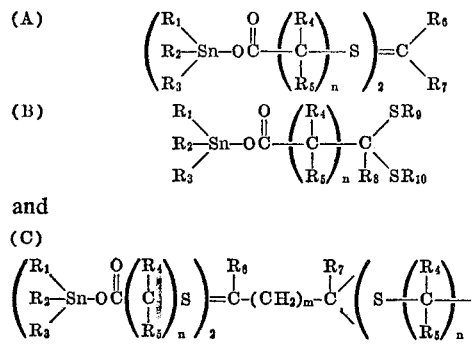

and where $R_1$, $R_2$ and $R_3$ are selected from the group consisting of alkyl, aralkyl and aryl; $R_4$, $R_5$ and $R_8$ are selected from the group consisting of hydrogen, alkyl and aryl;

$R_6$ and $R_7$ are individually selected from the group consisting of hydrogen, alkyl, aryl,

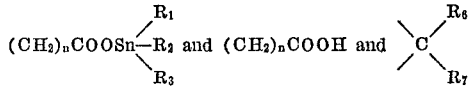

together are cyclopentylidene or cyclohexylidene;

$R_9$ and $R_{10}$ are selected from the group consisting of alkyl, aryl, carboxylic acid and carboxylic acid ester;

$n$ is an integer between 1 and 4 inclusive; and $m$ is an integer between 0 and 8 inclusive.

3. A process according to claim 2 wherein the total number of carbon atoms in the hydrocarbon groups attached to each tin atom is from 9 to 20 inclusive.

4. A process according to claim 2 wherein the tin salt is present in an alkyd resin base, vinyl base or rosin base antifouling paint.

References Cited

UNITED STATES PATENTS

| | | | |
|---|---|---|---|
| 2,970,923 | 2/1961 | Sparmann | 106—15 |
| 3,078,290 | 2/1963 | Hechenbleikner et al. | 260—429.7 |
| 3,167,473 | 1/1965 | Leebrick | 106—15 XR |
| 3,196,129 | 7/1965 | Hechenbleikner et al. | 260—429.7 |
| 3,214,279 | 10/1965 | Scott | 106—15 |
| 3,217,004 | 11/1965 | Hechenbleikner et al. | 260—429.7 |
| 3,236,793 | 2/1966 | Robins et al. | 106—15 XR |
| 3,299,002 | 1/1967 | Stamm et al. | 106—15 XR |

S. K. ROSE, Primary Examiner

U.S. Cl. X.R.

424—288